US012634112B2

(12) United States Patent
Moon et al.

(10) Patent No.: US 12,634,112 B2
(45) Date of Patent: May 19, 2026

(54) HOMOMORPHIC ENCRYPTION OPERATOR, STORAGE DEVICE INCLUDING THE SAME, AND LEVEL CONFIGURATION METHOD THEREOF

(71) Applicant: Samsung Electronics Co., Ltd., Suwon-si (KR)

(72) Inventors: Young Sik Moon, Suwon-si (KR); Jiyoup Kim, Suwon-si (KR); Hanbyeul Na, Suwon-si (KR); Hong Rak Son, Suwon-si (KR); Seonghyeog Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 18/312,936

(22) Filed: May 5, 2023

(65) Prior Publication Data

US 2024/0072992 A1    Feb. 29, 2024

(30) Foreign Application Priority Data

Aug. 30, 2022    (KR) ........................ 10-2022-0109435

(51) Int. Cl.
*H04L 9/00* (2022.01)
*H04L 9/08* (2006.01)

(52) U.S. Cl.
CPC ............ *H04L 9/008* (2013.01); *H04L 9/0869* (2013.01)

(58) Field of Classification Search
CPC . H04L 9/008; H04L 9/0869; H04L 2209/805; G06F 7/575; G06F 7/53
See application file for complete search history.

(56) References Cited

U.S. PATENT DOCUMENTS 10,333,696 B2    6/2019    Ahmed
2009/0136025 A1    5/2009    Kargl et al.
(Continued)

FOREIGN PATENT DOCUMENTS

KR          102040106 B1    11/2019
KR     1020210116299 A    9/2021
(Continued)

OTHER PUBLICATIONS

Kim, Andrey, Antonis Papadimitriou, and Yuriy Polyakov. "Approximate Homomorphic Encryption with Reduced Approximation Error." Topics in Cryptology—CT-RSA 2022. Ed. by Steven D. Galbraith. Cham: Springer International Publishing, 2022. 120-144. Web. (Year: 2021).*

(Continued)

*Primary Examiner* — Jung W Kim
*Assistant Examiner* — James P Moles
(74) *Attorney, Agent, or Firm* — Wolf, Greenfield & Sacks, P.C.

(57)          ABSTRACT

A homomorphic encryption operator includes: a level configuration unit configured to set an encryption level by selecting a plurality of prime numbers of different values according to a scale factor condition used for multiplication of a homomorphic encryption operation and an increase/decrease condition for increasing or decreasing consecutively selected prime numbers, and a modular multiplication operator configured to perform lightweight modular multiplication using the selected plurality of prime numbers, wherein the level configuration unit includes: a level constructor configured to select prime number sets whose number have selected Hamming weights, respectively, based on the scale factor condition and the increase/decrease condition, and wherein the level configuration unit is further (Continued)

configured to configure the selected prime number sets with the encryption level using a prime number table.

18 Claims, 9 Drawing Sheets

(56) References Cited

U.S. PATENT DOCUMENTS

| | | | | |
|---|---|---|---|---|
| 2016/0164671 | A1* | 6/2016 | Gentry | H04L 63/0442 |
| | | | | 380/28 |
| 2020/0374103 | A1* | 11/2020 | Cheon | G06F 7/722 |
| 2021/0243005 | A1 | 8/2021 | Zhang et al. | |
| 2021/0344479 | A1 | 11/2021 | Lee et al. | |
| 2021/0376996 | A1 | 12/2021 | Moon et al. | |
| 2022/0085970 | A1 | 3/2022 | Al Badawi et al. | |
| 2022/0094521 | A1 | 3/2022 | Moon et al. | |
| 2023/0012099 | A1* | 1/2023 | Papadimitriou | H04L 9/008 |
| 2023/0141837 | A1* | 5/2023 | Moon | H04L 9/0656 |
| | | | | 713/189 |
| 2023/0145760 | A1* | 5/2023 | Cheon | G06F 7/38 |
| | | | | 708/200 |
| 2024/0039691 | A1* | 2/2024 | Ezov | G06N 3/08 |

FOREIGN PATENT DOCUMENTS

| | | |
|---|---|---|
| KR | 1020210135075 A | 11/2021 |
| KR | 1020210147645 A | 12/2021 |
| KR | 102349855 B1 | 1/2022 |
| KR | 1020220040309 A | 3/2022 |

OTHER PUBLICATIONS

Cheon, et al., "A Full RNS Variant of Approximate Homomorphic Encryption", International Conference on Selected Areas in Cryptography (SAC), 2018, 1-18.

Kim, et al., "FPGA-based Accelerators of Fully Pipelined Modular Multipliers for Homomorphic Encryption", 2019 International Conference on ReConFigurable Computing and FPGAs (ReConFig), 2019, 1-8.

* cited by examiner

1110 Processing Unit

1130 Working Memory

1150 Host I/F

1160 HE Operation Unit

1170 NVM I/F

Host

NVM

FIG. 4

Algorithm: Method for configuring the level of HE

1: Select base prime $q_0$ and start scale factor $q_L$ according to a condition required by the system
(Hamming weight $h_p$ of prime numbers, polynomial order N of homomorphic encryption, $\sigma$ of Gaussian error to be inserted, Hamming weight $h_s$ of secret key, and required output precision bit)

2: Select a prime $q_{L-1}$ with a target Hamming weight $h_p$ in the following range;

$$-\log_2 B_{clean} < \log_2\left(\frac{q_L}{q_{L-1}}\right) < \log_2\left(\frac{q_0}{q_L}\right)$$

3: Select a prime $q_{L-2}$ with a target Hamming weight $h_p$, $\log_2\left(\frac{q_L}{q_{L-2}}\right) \cong \mp 2\alpha$, to satisfy the following range;

$$-\log_2 B_{clean} < \log_2\left(\frac{q_L}{q_{L-2}}\right) < \log_2\left(\frac{q_0}{q_L}\right)$$

$$\log_2 q_{i-1} = \log_2(q_i) \pm \alpha, \ \log_2 q_{i-2} = \log_2(q_i) \mp 2\alpha$$

4: if number of selected primes < target level L then,
5:   repeat step 2 & 3
6: else if
7:   configure the level of prime (e.g., LUT)

FIG. 6

Algorithm: Method for configuring the level of HE

1: Select base prime $q_0$ and start scale factor $q_L$ according to a condition required by the system
(Hamming weight $h_p$ of prime numbers, polynomial order $N$ of homomorphic encryption, $\sigma$ of Gaussian error to be inserted, Hamming weight $h_s$ of secret key, and required output precision bit)

2: Select a prime $q_{L-1}$ with a target Hamming weight $h_p$ in the following range;

$$-\log_2 B_{clean} < \log_2\left(\frac{q_L}{q_{L-1}}\right) < \log_2\left(\frac{q_0}{q_L}\right)$$

3: When $\log_2\left(\frac{q_L}{q_{L-2}}\right) = \pm\alpha$, select a prime $q_{L-2}$ with a target Hamming weight $h_p$, $$\log_2\left(\frac{q_L}{q_{L-2}}\right) \cong \mp 2\alpha, \; -\log_2 B_{clean} < \log_2\left(\frac{q_L}{q_{L-2}}\right) < \log_2\left(\frac{q_0}{q_L}\right).$$

4: Select a prime $q_{L-3}$ with a target Hamming weight $h_p$ in the following range;

$$-\log_2 B_{clean} < \log_2\left(\frac{q_L}{q_{L-3}}\right) < \log_2\left(\frac{q_0}{q_L}\right)$$

5: When $\log_2\left(\frac{q_L}{q_{L-3}}\right) = \pm\beta$, select a prime $q_{L-4}$ with a target Hamming weight $h_p$, $\log_2\left(\frac{q_L}{q_{L-4}}\right) = \mp 2\beta$, to satisfy the following range;

$$-\log_2 B_{clean} < \log_2\left(\frac{q_L}{q_{L-4}}\right) < \log_2\left(\frac{q_0}{q_L}\right)$$

6: if number of selected primes < target level L then,
7: repeat step 4 , 5
8: else if
9: configure the level of prime (e.g., LUT)

2300

| Level | Rescale prime $q_i$ | Scale factor / bit |
|---|---|---|
| 4 | 134250497 | 27 |
| 3 | 136314881 | 27 |
| 2 | 138412033 | 26.98 |
| 1 | 536903681 | 26.91 |

2400

| Level | Rescale prime $q_i$ | Scale factor / bit |
|---|---|---|
| 12 | 136314881 | 27.02 |
| 11 | 537133057 | 25.04 |
| 10 | 8519681 | 27.07 |
| 9 | 138412033 | 27.09 |
| 8 | 536903681 | 25.17 |
| 7 | 8650753 | 27.3 |
| 6 | 69206017 | 28.56 |
| 5 | 1073872897 | 27.12 |
| 4 | 134250497 | 27.25 |
| 3 | 67239937 | 28.5 |
| 2 | 1074266113 | 26.99 |
| 1 | 134348801 | 26.98 |

2200

2100

| Prime | bit |
|---|---|
| 8519681 | 23.02 |
| 8650753 | 23.04 |
| 67239937 | 26 |
| 69206017 | 26.04 |
| 134250497 | 27 |
| 134348801 | 27 |
| 136314881 | 27.02 |
| 138412033 | 27.04 |
| 536903681 | 29 |
| 537133057 | 29 |
| 1073872897 | 30 |
| 1074266113 | 30 |

HOMOMORPHIC ENCRYPTION OPERATOR, STORAGE DEVICE INCLUDING THE SAME, AND LEVEL CONFIGURATION METHOD THEREOF

CROSS-REFERENCE TO RELATED APPLICATIONS

This application claims priority under 35 U.S.C. § 119 to Korean Patent Application No. 10-2022-0109435 filed on Aug. 30, 2022, in the Korean Intellectual Property Office, the disclosures of which are incorporated by reference herein in their entireties.

BACKGROUND

Embodiments of the present disclosure described herein relate to a homomorphic encryption system, and more particularly, to a homomorphic encryption operator, a storage device including the same, and a level configuration method thereof.

Cryptographic technology is used to encrypt messages to protect information. In recent years, with the development of communication and the generalization of mobile devices, security requirements for personal information are increasing. For the protection of personal information, messages are usually transmitted or stored by encrypting them using a secret key. However, along with the development of encryption technology, security attack technology is also developing. Security attackers are trying various techniques to hack the secret key. Accordingly, there is a growing concern about the risk of security accidents due to negligence in the delivery or management of the secret key.

Homomorphic encryption, which is a fourth-generation encryption technology, can provide the same result as the encrypted value after operation on the plaintext even if the operation is performed in the ciphertext state without decrypting the encrypted information. When homomorphic encryption is used, various operations, such as statistical processing and machine learning, can be performed without decrypting the ciphertext. If homomorphic encryption is used, there is an advantage in that the probability of revealing the secret key is relatively small. Therefore, homomorphic encryption is a key element technology that companies that provide big data based services follow the development of.

Among homomorphic encryption technologies, the closest technology to commercialization is the Fully Homomorphic Encryption technology, which addresses the limitation on the number of operations by applying rebooting technology. However, in homomorphic encryption, the number of prime numbers used to generate ciphertext may be limited by various constraints. For example, in a homomorphic encryption system that applies a residual number system (hereinafter, RNS), prime numbers used in ciphertext must be relatively prime, have similar bit size, and have low Hamming Weight. Because the number of prime numbers satisfying these conditions is less than the number required for system configuration, it may be difficult to construct a lightweight homomorphic encryption operator.

SUMMARY

Embodiments of the present disclosure provide a method for sufficiently securing the number of prime numbers satisfying system requirements in a lightweight homomorphic encryption operator.

According to an embodiment of the inventive concept, a homomorphic encryption operator comprises: a level configuration unit configured to set an encryption level by selecting a plurality of prime numbers of different values based on a scale factor condition used for multiplication in a homomorphic encryption operation and an increase/decrease condition for increasing or decreasing consecutively selected prime numbers, and a modular multiplication operator configured to perform lightweight modular multiplication using the selected plurality of prime numbers, wherein the level configuration unit includes: a level constructor configured to select prime number sets whose numbers have selected Hamming weights, respectively, based on the scale factor condition and the increase/decrease condition, and wherein the level configuration unit is further configured to configure the selected prime number sets with the encryption level using a prime number table.

According to another embodiment of the inventive concept, a method for configuring an encryption level of a homomorphic encryption system, comprises: selecting a base prime number '$q_0$' and a starting scale factor '$q_L$' based on requirements of the homomorphic encryption system, selecting a first prime number ($q_{L-1}$) that has a target Hamming weight and satisfies an expression $$-\log_2 B_{clean} < \log_2\left(\frac{q_L}{q_{L-1}}\right) < \log_2\left(\frac{q_0}{q_L}\right),$$

selecting a second prime number ($q_{L-2}$) that has the target Hamming weight and satisfies an expression $$-\log_2 B_{clean} < \log_2\left(\frac{q_L}{q_{L-2}}\right) < \log_2\left(\frac{q_0}{q_L}\right)$$

where $B_{clean}$ is an encryption error, and when a number of selected prime numbers reaches a target level, configuring an encryption level for a homomorphic encryption operation using the selected prime numbers, wherein an increase/decrease between the first prime number ($q_{L-1}$) and the second prime number ($q_{L-2}$) corresponds to a value that offsets the increase/decrease between the starting scale factor ($q_L$) and the first prime number ($q_{L-1}$).

According to an embodiment of the inventive concept, a storage device configured to perform cryptographic operations comprises: at least one nonvolatile memory device; and a storage controller configured to control data input/output of the at least one nonvolatile memory device, and including a homomorphic encryption operator configured to encrypt the data based on a homomorphic encryption method, wherein the homomorphic encryption operator comprises: a level configuration unit configured to set an encryption level by selecting a plurality of prime numbers of different values based on a scale factor condition used in a lightweight modular multiplication operation and an increase/decrease condition for increasing or decreasing consecutively selected prime numbers, and a modular multiplication operator configured to perform the lightweight modular multiplication operation using the selected prime numbers.

BRIEF DESCRIPTION OF THE FIGURES

The above and other objects and features of the present disclosure will become apparent by describing in detail embodiments thereof with reference to the accompanying drawings.

FIG. 2 is a block diagram illustrating the configuration of the memory controller of FIG. 1.

FIG. 4 is a diagram illustrating an encryption level configuration algorithm performed in the homomorphic encryption operator according to some embodiments.

FIG. 6 is a diagram illustrating another example of an encryption level configuration algorithm performed in the homomorphic encryption operator according to some embodiments.

DETAILED DESCRIPTION

Figure 1:
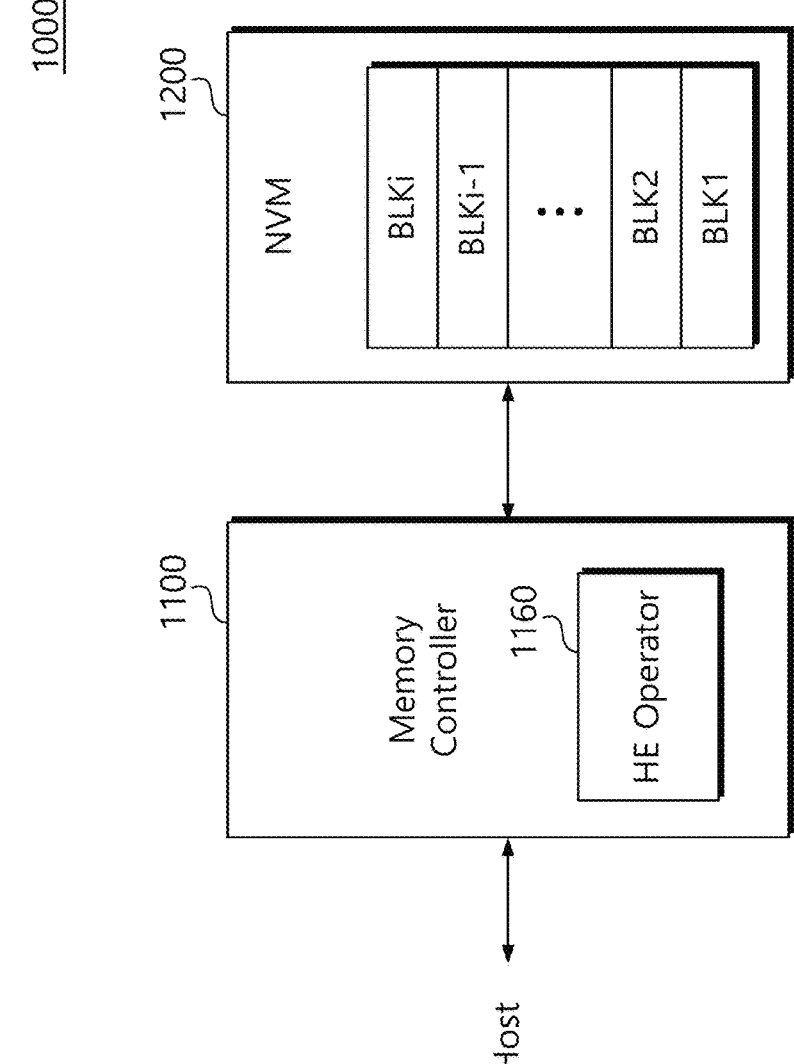
FIG. 1 is a block diagram illustrating a storage device using the homomorphic encryption operator according to some embodiments.

Hereinafter, example embodiments of the present disclosure will be described with reference to the accompanying drawings. The present disclosure may, however, be embodied in many different forms and should not be construed as limited to the embodiments set forth herein. Like reference numerals refer to like elements throughout this application. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a block diagram illustrating a storage device using the homomorphic encryption operator according to some embodiments. Referring to FIG. 1, a storage device 1000 includes a memory controller 1100 and a nonvolatile memory device 1200. For example, each of the memory controller 1100 and the nonvolatile memory device 1200 may be provided as one chip, one package, or one module. In other embodiments, the memory controller 1100 and the nonvolatile memory device 1200 may be formed as one chip, one package, or one module, and may be provided as storage, such as an embedded memory, a memory card, a memory stick, and a solid state drive SSD.

The memory controller 1100 may be configured to control the nonvolatile memory device 1200. For example, the memory controller 1100 may write data to the nonvolatile memory device 1200 or read data stored in the nonvolatile memory device 1200 according to a request from the host. To access the nonvolatile memory device 1200, the memory controller 1100 may provide a command, an address, data, and a control signal to the nonvolatile memory device 1200.

In particular, the memory controller 1100 may include a homomorphic encryption operator 1160 according to an embodiment of the inventive concept. For example, when a write request for secure data is input from the host, the memory controller 1100 may encrypt the data using the homomorphic encryption operator 1160 and write the data to the nonvolatile memory device 1200. In other embodiments, when the memory controller 1100 reads data encrypted with the homomorphic encryption from the nonvolatile memory device 1200, it may be decrypted using the homomorphic encryption operator 1160. In other embodiments, the memory controller 1100 may perform various operations, such as statistical processing or machine learning, in a state in which data encrypted with the homomorphic encryption stored in the nonvolatile memory device 1200 is not decrypted according to a request of the host.

For this function, the homomorphic encryption operator 1160 may include a modular multiplication operator using only lightweight modular multipliers and a level configuration unit for supporting the same. The modular multiplication operator is configured to perform multiplication operations on prime numbers used in encryption. However, for the multiplication operation of homomorphic encryption, large hardware resources may be used for prime numbers with large Hamming weights. Conversely, according to the level constructing unit embodiments of the inventive concept, the sufficient number of primes required for cryptographic operation can be secured even with relatively small Hamming weights. Accordingly, the homomorphic encryption operator 1160 of embodiments of the inventive concept can provide high security performance with relatively few hardware resources and relatively low cost. A detailed configuration and function of embodiments of the homomorphic encryption operator 1160 will be described in detail with reference to the drawings below.

The nonvolatile memory device 1200 may store data received from the memory controller 1100 or transmit the stored data to the memory controller 1100 under the control of the memory controller 1100. Accordingly, data encrypted by the homomorphic encryption operator 1160 may be stored in the nonvolatile memory device 1200. The nonvolatile memory device 1200 may include a plurality of memory blocks BLK1 to BLKn-1. Each of the plurality of memory blocks BLK1 to BLKn-1 has a three-dimensional memory structure in which a word line layer is stacked in a vertical direction on a substrate. Each of the plurality of memory blocks BLK1 to BLKn-1 may be managed by the memory controller 1100 using wear leveling information, such as an erase count.

According to the above embodiment of the present invention, the homomorphic encryption operator 1160 of the storage device 1000 may meet the system requirements and may secure a sufficient number of prime numbers required for the homomorphic encryption operation. Accordingly, the homomorphic encryption operator 1160 may be implemented with relatively few hardware resources through an encryption operation using only a lightweight modular multiplier.

Figure 2:
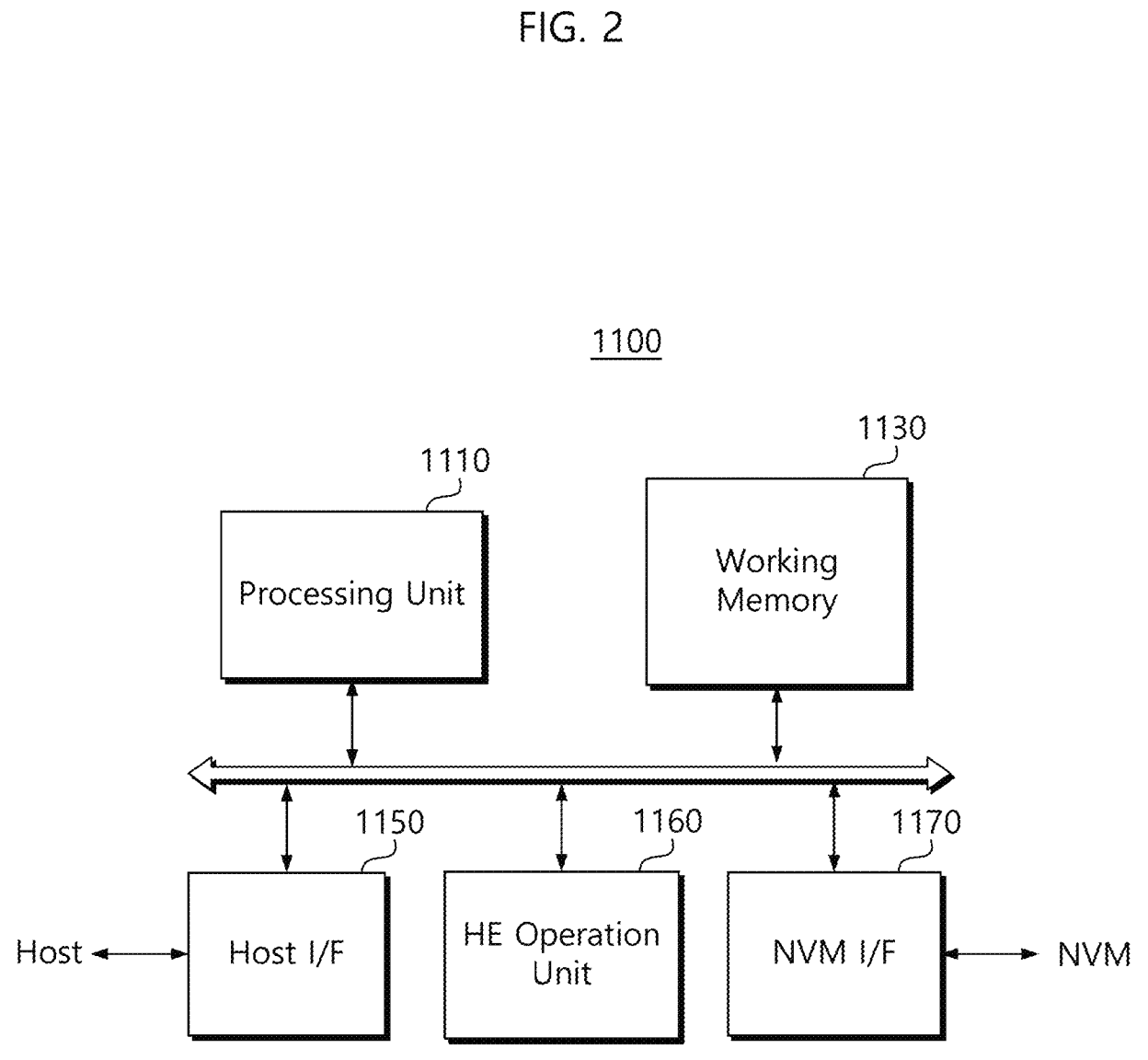

FIG. 2 is a block diagram illustrating the configuration of the memory controller of FIG. 1 according to some embodiments. Referring to FIG. 2, the memory controller 1100 according to some embodiments includes a processing unit 1110, a working memory 1130, a host interface 1150, a homomorphic encryption operator 1160, and a flash interface 1170. However, it will be well understood that the components of the memory controller 1100 are not limited to the aforementioned components. For example, the memory controller 1100 may further include a read only memory (ROM) or an error correction code block (ECC block) for storing code data used for a booting operation.

The processing unit 1110 may include a central processing unit or a micro-processor. The processing unit 1110 may execute firmware for driving the memory controller 1100. In particular, the processing unit 1110 may execute software loaded into the working memory 1130. For example, the processing unit 1110 may execute core functions of the storage device 1200, such as a flash translation layer FTL.

The working memory 1130 is loaded with software (or firmware) or data for controlling the memory controller 1100. Software and data loaded into the working memory 1130 are executed or processed by the processing unit 1110. The working memory 1130 may be loaded with a flash translation layer FTL or various application programs. The flash translation layer executed by the processing unit 1110 generally performs functions, such as address mapping, garbage collection, and wear leveling.

The host interface 1150 provides an interface between the host and the memory controller 1100. The host and the memory controller 1100 may be connected through one of various standardized interfaces. Here, the standard interfaces may include various interface standards, such as ATA (Advanced Technology Attachment), SATA (Serial ATA), e-SATA (external SATA), SCSI (Small Computer Small Interface), SAS (Serial Attached SCSI), PCI (Peripheral component Interconnection), PCIe (PCI Express), USB (Universal Serial Bus), IEEE 1394, UFS (Universal Flash Storage), eMMC (Embedded Multi Media Card), and/or NVMe, CXL (Compute eXpress Link).

The homomorphic encryption operator 1160 may include a modular multiplication operator composed of lightweight modular multipliers and a level configuration unit for supporting the modular multiplication operator. The homomorphic encryption operator 1160 can secure a sufficient number of prime numbers used for a homomorphic encryption operation even with relatively small Hamming weights (e.g., 3, 4, 5) through the level configuration unit. The homomorphic encryption operator 1160 may provide a more relaxed condition than the existing condition that the bit size values of prime numbers selected through the level configuration unit should be similar. Therefore, according to the homomorphic encryption operator 1160 of the present invention, a homomorphic encryption operation providing high security performance with relatively small hardware resources and relatively low cost may be possible. Here, it has been described that the homomorphic encryption operator 1160 is composed of hardware, but embodiments of the inventive concept are not limited thereto. That is, the homomorphic encryption operator 1160 is configured as a software module and loaded into the working memory 1130, and may be executed by processors, such as the processing unit 1110 or GPU.

The flash interface 1170 provides an interface between the memory controller 1100 and the nonvolatile memory device 1200. For example, data processed by the processing unit 1110 is stored in the nonvolatile memory device 1200 through the flash interface 1170. As another example, data stored in the nonvolatile memory device 1200 may be exchanged with the memory controller 1100 through the flash interface 1170.

The configurations of the memory controller 1100, according to some embodiments, described above have been described. According to the function of the memory controller 1100 in some embodiments of the inventive concept, high security performance can be provided by the function of the homomorphic encryption operator 1160. In addition, the homomorphic encryption operator 1160 may secure a sufficient number of prime numbers required for an encryption operation by applying the relaxed prime selection condition. In addition, because a lightweight modular multiplier may be used, the storage device 1000 having generally high security performance at a relatively low cost may be supported.

Figure 3:
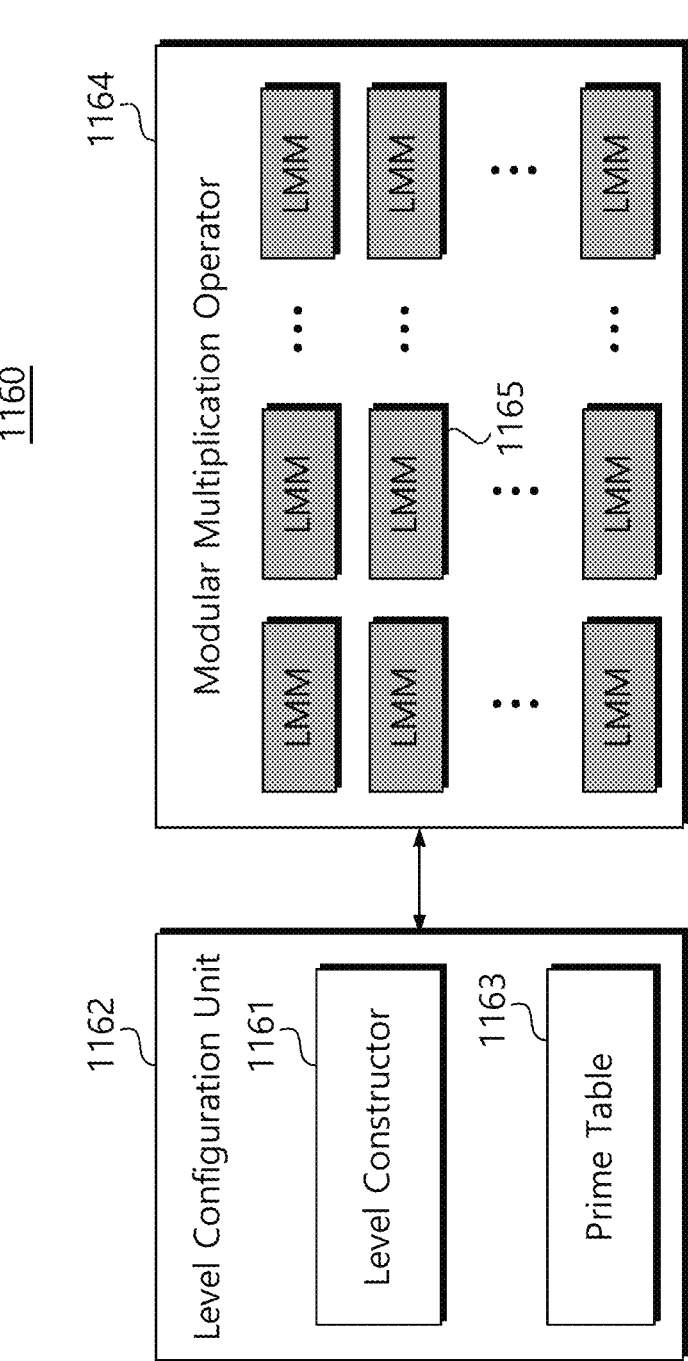
FIG. 3 is a block diagram illustrating a detailed configuration of the homomorphic encryption operator FIG. 2.

FIG. 3 is a block diagram illustrating a detailed configuration of the homomorphic encryption operator of FIG. 2 according to some embodiments. Referring to FIG. 3, the homomorphic encryption operator 1160 includes a level constructing unit 1162 and a modular multiplication operator 1164.

The level configuration unit 1162 may include a level constructor 1161 and a prime table 1163. The level constructor 1161 defines a prime bit size value condition used for homomorphic encryption operations. Hereinafter, a small number of bit size value conditions of the present invention will be referred to as a first condition. And the level constructor 1161 applies a selection condition that can secure as many prime numbers as possible within the relaxed bit size value condition. The selection condition of these prime numbers will be referred to as a second condition hereinafter.

The first condition defined in the level constructor 1161 may be derived from a constraint condition of a scale factor. That is, the scale factor '$s_i$' is determined by the prime number '$q_i$' used in homomorphic encryption. Conventionally, a condition in which all scale factors are equal by setting all prime numbers to be almost the same value has been traditionally used, but in some embodiment of the inventive concept, a relaxed prime selection condition is defined.

First, the set of selected prime numbers is $\{q_0, q_1, \ldots, q_L\}$, set the scale factor to $\{s_1, s_2, \ldots, s_L\}$. Here, '$s_1=q_L$' and '$s_{i+1}=s_i^2/q_{L-1}$'. In this basic condition, the constraint of the scale factor can be expressed by Equation 1 below.

$$\frac{q_L}{B_{clean}} < s_i < q_0, 1 \le i \le L \qquad \text{[Equation 1]}$$

Here, '$B_{clean}$' represents an encryption error. Therefore, according to Equation 1, the scale factor '$s_i$' may be selected in a range larger than the starting scale factor '$q_L$' divided by the encryption error and smaller than the basic prime number '$q_0$'. In this condition, because the scale factor '$s_i$' indicates data accuracy after rescaling, it can be said that it is a condition that does not cause loss of original data while removing or reducing encryption errors.

In addition, the scale factor stabilization (invariant) condition of the encryption level composed of a decimal set can be expressed by Equation 2 below.

$$s_L\left(\frac{q_L^{2^{L-1}}}{\prod_{i=1}^{L-1} q_i^{2^{i-1}}}\right) \cong s_1(=q_L) \qquad \text{[Equation 2]}$$

The scale factor stabilization condition expressed by Equation 2 indicates that the scale factors may have values similar to the start scale factor '$q_L$'.

In the Cheon-Kim-Kim-Song scheme (CKKS), which is one example homomorphic encryption technique, the scale factor is a value that determines the precision bit of the original data. In the homomorphic encryption system, the output precision corresponds to a value obtained by subtracting the encryption error '$B_{clean}$' and the operation depth 'L' from the starting scale factor '$s_1=q_L$'. Here, the encryption error '$B_{clean}$' and the computation depth 'L' are values determined when constructing the homomorphic encryption system.

If Equation 1 representing the basic condition of the scale factor '$s_i$' and the constraint condition, and Equation 2 representing the stabilization condition of the scale factor '$s_i$' are summarized as a prime number expression, Equation 3 can be obtained as set forth below.

$$-\log_2 B_{clean} < \sum_{i=1}^{j-1} 2^{i-1} \log_2\left(\frac{q_L}{q_i}\right) < \log_2\left(\frac{q_0}{q_L}\right), \; 2 \le j \le L \qquad \text{[Equation 3]}$$

In the existing technique, there is a constraint that the bit size value of prime numbers ($q_i$, $1 \le i \le L$) used in homomorphic encryption should be almost the same. In contrast, according to some embodiments of the inventive concept, a set of prime numbers $\{q_0, q_1, \ldots, q_L\}$ having different bit size values within a range satisfying Equation 3 can be selected.

According to Equation 3 in the form of an inequality, the intermediate term represents a value accumulated by multiplying the difference between the start scale factor '$q_L$' and the prime numbers ($q_i$, $1 \le i \le L$) by '$2^{i-1}$'. The prime number '$q_i$' may be selected within the range between the upper limit '$\log_2(q_0/q_L)$' and the lower limit of the negative value of the bit-width of the encryption error.

In the above-mentioned Equation 3, in contrast to the prime number '$q_L$' first used for operation in the homomorphic encryption, a prime number ($q_i$, $1 \le i \le L-1$) used later is multiplied by a weight '$2^{i-1}$' and accumulated. Therefore to satisfy Equation 3 even in a large 'L' depth, it may be advantageous to select prime numbers so that the increase or decrease in the size of the prime number '$q_i$' can be chained off. Therefore, if the prime numbers of the condition are configured in a chain form as shown in Equation 4 below, the increase or decrease in the size of the prime numbers can be chain-offset. Accordingly, it is possible to select the prime number '$q_i$' even in a relatively large 'L' depth, thereby securing a large number of prime numbers to be used in homomorphic encryption operations.

$$\log_2 q_{i-1} = \log_2(q_i) \pm \alpha, \; \log_2 q_{i-2} = \log_2(q_i) \mp 2\alpha \qquad \text{[Equation 4]}$$

Referring to Equation 4, the scale factor of the $\{i-1, i-2\}$ section is $$\frac{q_{i-1}^2}{q_{i-2}} = q_i.$$

Therefore, it can be seen that the prime number is offset while passing through the two levels while increasing or decreasing the difference of $\pm\alpha$, $\mp 2\alpha$. The prime number '$q_i$' may be selected within the range of Equation 5 below according to the scale factor constraint.

$$\frac{q_L}{B_{clean}} < q_i < q_0 \qquad \text{[Equation 5]}$$

The level constructor 1161 may configure the homomorphic encryption level with a sufficient number of prime numbers to be used in the homomorphic encryption operation according to the relaxed prime conditions of Equations 3 and 4. Accordingly, even the modular multiplication operator 1164 composed only of lightweight modular multipliers can sufficiently perform the multiplication operation required for the encryption operation.

The prime number table 1163 stores the prime numbers selected by the level constructor 1161 according to the conditions of Equations 3 and 4 and/or the level of the constructed homomorphic encryption. For example, when the operation depth of the modular multiplication operator 1164 is 'L', prime numbers greater than 'L' may be stored in the prime table 1163 in the form of a table. When a homomorphic encryption operation of the homomorphic encryption operator 1160 is requested, the prime number table 1163 may supply a corresponding number of primes according to the depth of the corresponding encryption operation.

The modular multiplication operator 1164 may include a plurality of lightweight modular multipliers (LMM) 1165. If the Hamming weight is a large prime number (e.g., 6 or more), a large number of hardware resource with relatively high performance may be required to process the modular multiplication of these prime numbers. In contrast, when prime numbers are selected according to the conditions of Equations 3 and 4 according to some embodiments of the inventive concept are used, the encryption operation can be performed using lightweight modular multipliers (LMMs) made of lightweight hardware.

In the above embodiments, the configuration and function of the homomorphic encryption operator 1160 of embodiments of the inventive concept have been briefly described. As described above, the level configuration unit 1162 may be capable of securing a sufficient number of prime numbers having a Hamming weight of a relatively small size (e.g., 3, 4, 5) for isomorphic cryptographic operation according to the prime number selection method according to embodiments of the inventive concept.

FIG. 4 shows an encryption level construction algorithm performed in the homomorphic encryption operator according to embodiments of the inventive concept. Referring to FIG. 4, the level configuration algorithm of the present invention may be performed based on Equations 1 to 5 described above.

In the first operation, a base prime '$q_0$' and a starting scale factor '$q_L$' are selected according to the requirements of the homomorphic encryption system. Here, the requirements of the homomorphic encryption system may include the Hamming weight of prime numbers ($h_p$), the degree of the homomorphic encryption polynomial (N), the standard deviation of the input Gaussian error ($\sigma$), the Hamming weight of the secret key ($h_s$), and/or a number of bits of output accuracy required.

In the second operation, a prime number '$q_{L-1}$' having a target Hamming weight ($h_p$) is selected. In this case, the selected prime number '$q_{L-1}$' may be selected in a range satisfying Equation 6 below.

$$-\log_2 B_{clean} < \log_2\left(\frac{q_L}{q_{L-1}}\right) < \log_2\left(\frac{q_0}{q_L}\right) \qquad \text{[Equation 6]}$$

In the third operation, a prime number '$q_{L-2}$' having a target Hamming weight ($h_p$) is selected. That is, when '$\log_2(q_L/q_{L-1}) = \pm\alpha$', a prime number '$q_{L-2}$' satisfying $$\log_2\left(\frac{q_L}{q_{L-2}}\right) \cong \mp 2\alpha$$

is selected to satisfy Equation 4 described above. In addition, the prime number '$q_{L-2}$' must satisfy Equation 7 below.

$$-\log_2 B_{clean} < \log_2\left(\frac{q_L}{q_{L-2}}\right) < \log_2\left(\frac{q_0}{q_L}\right) \qquad \text{[Equation 7]}$$

In this way, prime numbers $\{q_L, q_{L-1}, q_{L-2}\}$ can be selected by performing the procedure up to the third operation.

In a fourth operation, it is checked whether the number of selected prime numbers $\{q_L, q_{L-1}, q_{L-2}\}$ has reached a target level L. If the number of selected prime numbers $\{q_L, q_{L-1}, q_{L-2}\}$ does not reach the target level L, in the fifth operation, the second to third operations performed above are repeated to obtain additional prime numbers.

However, as in the sixth operation, if it is determined that the number of selected primes has reached the target level, the procedure proceeds to the seventh operation of constructing an encryption operation level using the selected primes. In the seventh operation, the selected prime numbers are constructed or stored in the form of a lookup table LUT, and will be used for a multiplication operation thereafter.

Figure 5:
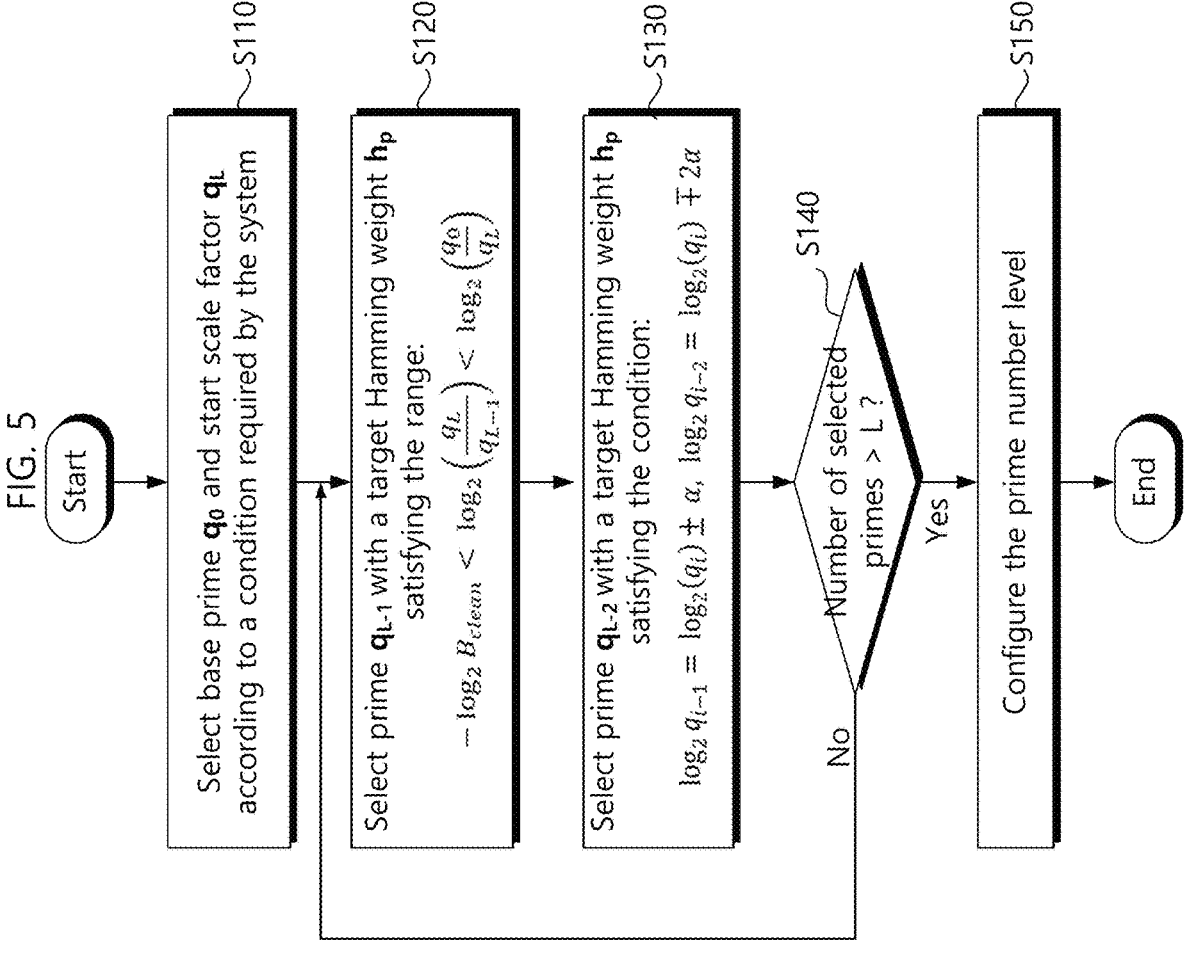
FIG. 5 is a flowchart illustrating a method for constructing a homomorphic encryption level according to some embodiments.

FIG. 5 is a flowchart illustrating a method for configuring a homomorphic encryption level according to embodiments of the inventive concept. Referring to FIG. 5, a sufficient number of prime numbers required for homomorphic encryption operation can be secured while meeting system requirements.

In operation S110, a base prime '$q_0$' and a starting scale factor '$q_L$' are selected according to the requirements of the homomorphic encryption system. Here, the requirements of the homomorphic encryption system may include the Hamming weight of prime numbers ($h_p$), the degree of the homomorphic encryption polynomial (N), the standard deviation of the input Gaussian error ($\sigma$), the Hamming weight of the secret key ($h_s$), and/or the required number of bits of output accuracy.

In operation S120, a prime number '$q_{L-1}$' having a target Hamming weight ($h_p$) is selected. In this case, the selected prime number '$q_{L-1}$' may be selected within a range satisfying Equation 6 described above.

In operation S130, a prime number '$q_{L-2}$' having a target Hamming weight ($h_p$) is selected. That is, when $\log_2(q_L/q_{L-1})=\pm\alpha$, a prime number '$q_{L-2}$' may be selected to satisfy Equation 4 and the condition $$\log_2\left(\frac{q_L}{q_{L-2}}\right) \cong \mp 2\alpha$$

described above. In addition, the prime number '$q_{L-2}$' must satisfy Equation 7 described above.

In operation S140, it is checked whether the number of prime numbers $\{q_L, q_{L-1}, q_{L-2}\}$ selected in steps S110 to S130 has reached a target level or depth L. If it is determined that the number of selected prime numbers is greater than the target level L ('Yes' direction), the procedure moves to operation S150. Conversely, if it is determined that the number of selected primes is not greater than the target level or depth L (in the 'No' direction), the procedure returns to operation S120 to continue the additional prime selection operation. It will be understood that, in an additional prime selection operation, the target Hamming weight ($h_p$) may be set to the value applied in the previous procedure, and may be increased or decreased.

In block S150, an encryption operation level is constructed using the selected prime numbers.

FIG. 6 is a diagram illustrating another example of an encryption operation level configuration algorithm performed in the homomorphic encryption operator according to some embodiments of the inventive concept. Referring to FIG. 6, the level configuration algorithm of the present invention may be performed based on Equations 1 to 5 described above.

In the first operation, a base prime '$q_0$' and a starting scale factor '$q_L$' are selected according to the requirements of the homomorphic encryption system. Here, the requirements of the homomorphic encryption system may include the Hamming weight of prime numbers ($h_p$), the degree of the homomorphic encryption polynomial (N), the standard deviation of the input Gaussian error ($\sigma$), the Hamming weight of the secret key ($h_s$), and/or the required number of bits of output accuracy.

In the second operation, a prime number '$q_{L-1}$' having a target Hamming weight ($h_p$) is selected. In this case, the selected prime number '$q_{L-1}$' may be selected within a range satisfying Equation 6 described above.

In the third operation, a prime number '$q_{L-2}$' having a target Hamming weight ($h_p$) is selected. That is, when '$\log_2(q_L/q_{L-1})=\pm\alpha$', a prime number '$q_{L-2}$' is selected to satisfy Equation 4 described above and condition $$\log_2\left(\frac{q_L}{q_{L-2}}\right) \cong \mp 2\alpha.$$

In addition, the prime number '$q_{L-2}$' must satisfy Equation 7. In this way, prime numbers $\{q_L, q_{L-1}, q_{L-2}\}$ can be selected by performing the procedure up to the third operation.

In the fourth operation, a prime number '$q_{L-3}$' having a target Hamming weight ($h_p$) is selected. In this case, the selected prime number '$q_{L-3}$' may be selected in a range satisfying Equation 8 below.

$$-\log_2 B_{clean} < \log_2\left(\frac{q_L}{q_{L-3}}\right) < \log_2\left(\frac{q_0}{q_L}\right) \qquad \text{[Equation 8]}$$

In the fifth operation, a prime number '$q_{L-4}$' having a target Hamming weight ($h_p$) is selected. That is, when '$\log_2(q_L/q_{L-3})=\pm\beta$', a prime number '$q_{L-4}$' is selected to satisfy Equation 4 described above and the condition $$\log_2\left(\frac{q_L}{q_{L-4}}\right) \cong \mp 2\beta.$$

In addition, the prime number '$q_{L-4}$' must satisfy Equation 9 below.

$$-\log_2 B_{clean} < \log_2\left(\frac{q_L}{q_{L-4}}\right) < \log_2\left(\frac{q_0}{q_L}\right) \qquad \text{[Equation 9]}$$

In the sixth operation, prime numbers $\{q_L, q_{L-1}, q_{L-2}, q_{L-3}, q_{L-4}\}$ may be selected by performing the procedure up to the fifth operation. At this time, it is checked whether the number of selected prime numbers $\{q_L, q_{L-1}, q_{L-2}, q_{L-3}, q_{L-4}\}$ has reached the target level L. If the number of selected prime numbers $\{q_L, q_{L-1}, q_{L-2}, q_{L-3}, q_{L-4}\}$ does not reach the target level L, in the seventh operation, by repeating the fourth to fifth operations performed above, additional prime numbers may be secured or obtained.

Conversely, as in the sixth operation, if it is determined that the number of selected primes has reached the target level L, the procedure proceeds to a ninth operation of constructing an encryption operation level using the selected primes. In the ninth operation, the selected prime numbers are constructed or stored in the form of a lookup table LUT, which will be used for a multiplication operation thereafter.

Figure 7:
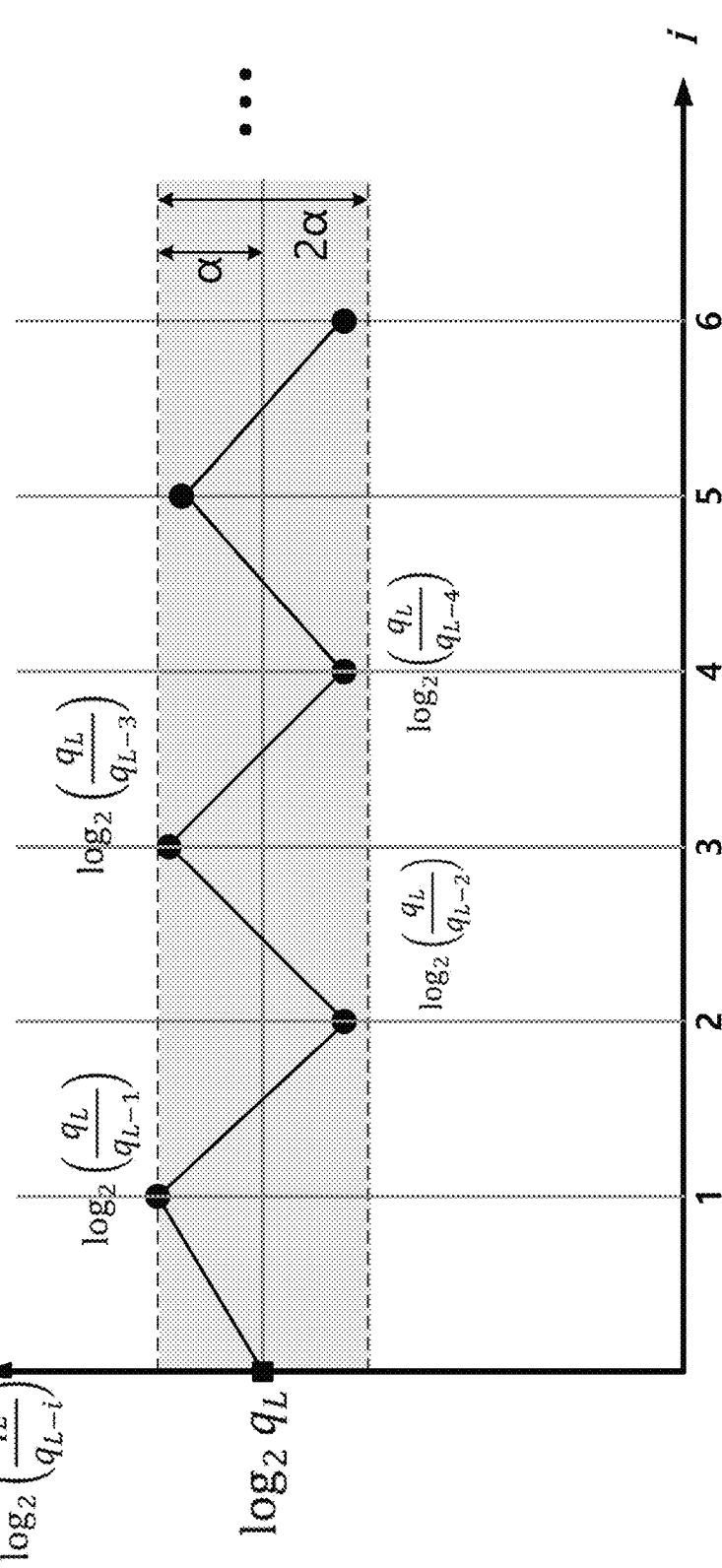
FIG. 7 is a graph illustrating a change in the size of selected prime numbers described in FIG. 6.

FIG. 7 is a graph illustrating a change in the values of selected prime numbers described in FIG. 6. Referring to FIG. 7, it can be seen that prime numbers selected according to the conditions of Equations 3 and 4 maintain similar values while repeating the increase/decrease of '$\pm\alpha$, $\mp2\alpha$' in a chain around the start scale factor '$q_L$'.

Initially, a base prime '$q_0$' and a starting scale factor '$q_L$' are selected according to the requirements of the homomorphic encryption system. Then, a prime number '$q_{L-1}$, i=1' satisfying the conditions of Equations 3 and 4 is selected. At this time, the prime number '$q_{L-1}$, i=1' becomes '$\log_2(q_L/q_{L-1})=+\alpha$' having an increasing value. Subsequently, a prime number '$q_{L-2}$, i=2' is selected according to Equation 4. The prime number '$q_{L-2}$, i=2' corresponds to '$\log_2(q_L/q_{L-2})=-2\alpha$', which has a decreasing magnitude than the prime number '$q_{L-1}$, i=1'.

Then, a prime number '$q_{L-3}$, i=3' satisfying Equation 8 is selected. At this time, it may be '$\log_2(q_L/q_{L-2})=+2\alpha$', but it may also be changed to '$\log_2(q_L/q_{L-3})=\pm\beta$' or $$\log_2\left(\frac{q_L}{q_{L-4}}\right) \cong \mp2\beta,$$

according to a change in the weight.

In this way, a plurality of primes $\{q_L, q_{L-1}, q_{L-2}, q_{L-3}, q_{L-4}\}$ can be selected from a range of primes of similar bit size value. The selected number of primes $\{q_L, q_{L-1}, q_{L-2}, q_{L-3}, q_{L-4}\}$ will be repeated until a target level L can be constructed or obtained.

Figure 8:
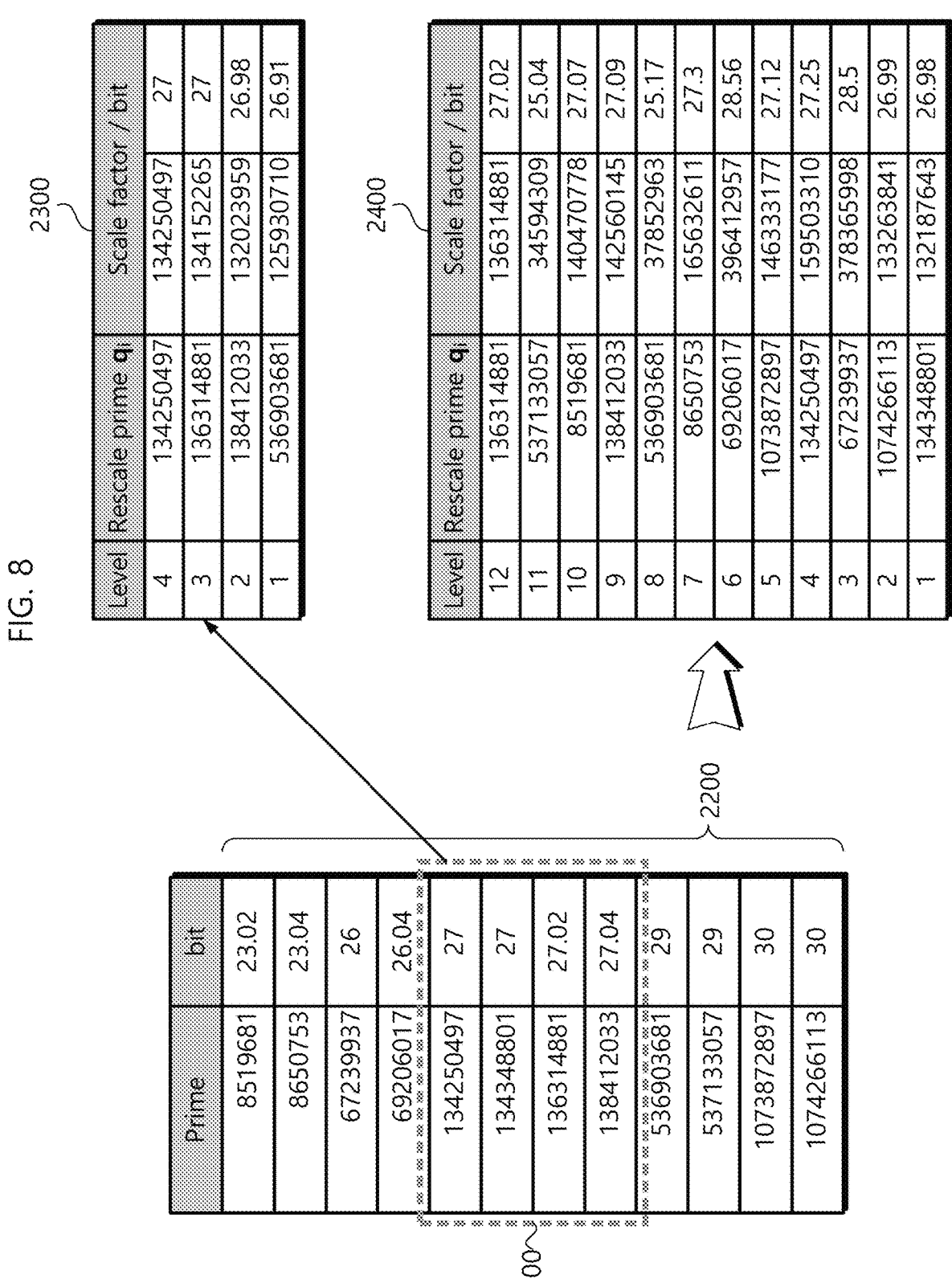
FIG. 8 is a table illustrating some effects of some embodiments.

FIG. 8 is a table illustrating the effects of embodiments of the inventive concept. Referring to FIG. 8, the application of the prime number selection method according to some embodiments provides an example of configuring a prime number selection and homomorphic encryption level in a prime table with a Hamming weight ($h_p=3$) within a range of 20 to 30 bits.

When a conventional prime number selection method is applied, only the prime number set 2100 having similar bit size values of the selected prime numbers may be selected. In this case, according to the configurable homomorphic encryption level 2300, only four levels of 27-bit size can be configured.

Conversely, according to the prime number selection method according to embodiments of the inventive concept, all given prime numbers in the table 2200 satisfying Equations 3 and 4 may be selected. Therefore, according to the configurable homomorphic encryption level 2400, 12 or more levels can be configured.

Figure 9:
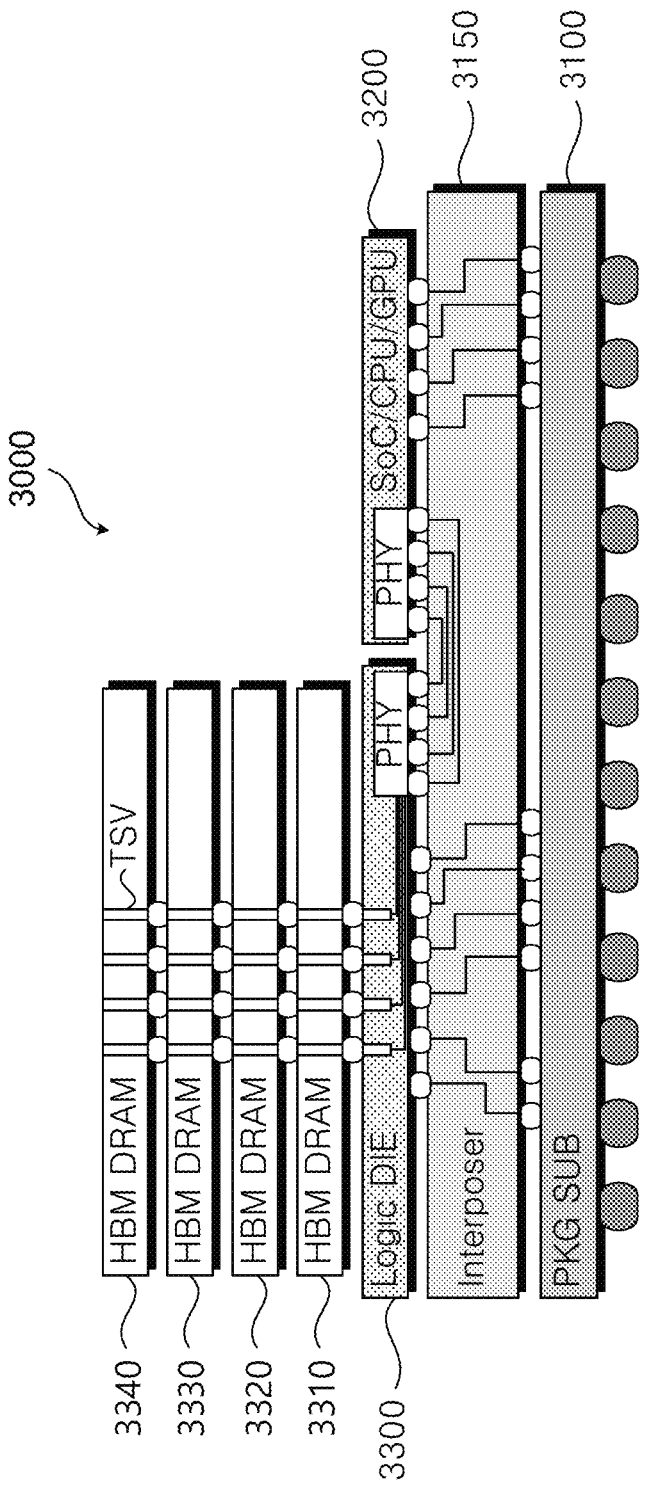
FIG. 9 is a cross-sectional view illustrating a memory system configured to perform various applied operations using a homomorphic encryption operator according to some embodiments.

FIG. 9 is a cross-sectional view illustrating a memory system capable of processing various applied operations using a homomorphic encryption operator according to an embodiment of the inventive concept. Referring to FIG. 9, a memory system 3000 implemented as a stacked memory includes a PCB substrate 3100, an interposer 3150, a host die 3200, a logic die 3300, and HBMs 3310, 3320, 3330, and 3340.

The memory system 3000 connects the HBMs 3310, 3320, 3330, and 3340 to the host die 3200 using the interposer 3150. The interposer 3150 is disposed on the PCB 3100 and is electrically connected to the PCB 3100 through flip chip bumps FB.

A host die 3200, a logic die 3300, and stacked HBMs 3310, 3320, 3330, and 3340 may be disposed on the interposer 3150. TSV lines are formed in the plurality of HBMs 3310, 3320, 3330, and 3340 to implement the memory system 3000. The TSV lines may be electrically connected to the micro bumps MB formed between the plurality of HBMs 3310, 3320, 3330, and 3340.

Here, data stored in at least one of the plurality of HBMs 3310, 3320, 3330, and 3340 may be processed by a homomorphic encryption operator to which the prime number selection method according to some embodiments of the present inventive concept is applied. For example, the homomorphic encryption operator may be formed of a part of the logic die 3300 or the host die 3200.

The above are specific embodiments for carrying out the present invention. In addition to the above-described embodiments, the present invention may include simple design changes or easily changeable embodiments. In addition, the present invention will include techniques that can be easily modified and implemented using the embodiments. Therefore, the scope of the present invention should not be limited to the above-described embodiments, and should be defined by the claims and equivalents of the claims of the present invention as well as the claims set forth below.

What is claimed is:

1. A homomorphic encryption operator, comprising:
a level configuration unit configured to set an encryption level by selecting a plurality of prime numbers of different values based on a scale factor condition used for multiplication in a homomorphic encryption operation and an increase/decrease condition for increasing or decreasing consecutively selected prime numbers, wherein a value accumulated by multiplying a difference between a log value of a start scale factor '$q_L$' and a log value of the selected prime numbers ($q_i$, $1 \le i \le L$) by '$2^{i-1}$' is distributed within a range with a bit width difference '$\log_2(q_0/q_L)$' of the scale factor '$q_L$' as an upper limit and a negative value of a bit-width of an encryption error as a lower limit; and
a modular multiplication operator configured to perform lightweight modular multiplication using the selected plurality of prime numbers,
wherein the level configuration unit includes:
a level constructor configured to select prime number sets whose numbers have selected Hamming weights, respectively, based on the scale factor condition and the increase/decrease condition; and
wherein the level configuration unit is further configured to configure the selected prime number sets with the encryption level using a prime number table.

2. The operator of claim 1, wherein the scale factor condition includes:
a scale factor '$s_i$' that is selected from a range greater than a value obtained by dividing the start scale factor '$q_L$' by the encryption error, and less than a base prime '$q_0$', where subscript L is an operation depth.

3. The operator of claim 2, wherein the scale factor condition includes a scale stabilization condition in which a difference between the scale factor '$s_i$' and the start scale factor '$q_L$' is within a reference level.

4. The operator of claim 1, wherein the selected prime numbers {q0, q1, . . . , qL} satisfy a condition of a first inequality below:

wherein '$B_{clean}$' is the encryption error in the starting scale factor '$s_1=q_L$', and subscript 'L' is $$-\log_2 B_{clean} < \sum_{i=1}^{j-1} 2^{i-1} \log_2\left(\frac{q_L}{q_i}\right) < \log_2\left(\frac{q_0}{q_L}\right), \, 2 \le j \le L$$

a computation depth.

5. The operator of claim 1, wherein the increase/decrease condition is that the increase or decrease of the two prime numbers {$q_{i-1}$, $q_{i-2}$} successively selected from the selected prime number '$q_i$' is set to be '$+\alpha$' and '$-2\alpha$', or '$-\alpha$' and '$+2\alpha$'.

6. The operator of claim 5, wherein the two prime numbers {$q_{i-1}$, $q_{i-2}$} successively selected from the selected prime number '$q_i$' are selected within a range satisfying a condition of a second inequality below:

$$\log_2 q_{i-1} = \log_2(q_i) \pm \alpha, \, \log_2 q_{i-2} = \log_2(q_i) \mp 2\alpha.$$

7. The operator of claim 1, wherein a Hamming weight of each of the selected prime numbers {$q_0$, $q_1$, . . . , $q_L$} is 3, 4, or 5.

8. The operator of claim 7, wherein the modular multiplication operator includes lightweight modular multipliers that are configured to perform the lightweight modular multiplication operation by a combination of a shift operation and an addition/subtraction operation using the selected prime numbers {$q_0$, $q_1$, . . . , $q_L$}.

9. A method for configuring an encryption level of a homomorphic encryption system using a homomorphic encryption operator executed by a memory controller, comprising:

selecting a base prime number '$q_0$' and a starting scale factor '$q_L$' based on requirements of the homomorphic encryption system;

selecting a first prime number ($q_{L-1}$) that has a target Hamming weight and satisfies an expression $$-\log_2 B_{clean} < \log_2\left(\frac{q_L}{q_{L-1}}\right) < \log_2\left(\frac{q_0}{q_L}\right);$$

selecting a second prime number ($q_{L-2}$) that has the target Hamming weight and satisfies an expression $$-\log_2 B_{clean} < \log_2\left(\frac{q_L}{q_{L-2}}\right) < \log_2\left(\frac{q_0}{q_L}\right)$$

where '$B_{clean}$' is an encryption error; and when a number of selected prime numbers reaches a target level, configuring an encryption level for a homomorphic encryption operation using the selected prime numbers, wherein an increase/decrease between the first prime number ($q_{L-1}$) and the second prime number ($q_{L-2}$) corresponds to a value that offsets the increase/decrease between the starting scale factor ($q_L$) and the first prime number ($q_{L-1}$).

10. The method of claim 9, wherein when the increase/decrease between the starting scale factor ($q_L$) and the first prime number ($q_{L-1}$) is '$+\alpha$', the increase/decrease between the first prime number ($q_{L-1}$) and the second prime number ($q_{L-2}$) is '$-2\alpha$'.

11. The method of claim 9, wherein when the increase/decrease between the starting scale factor ($q_L$) and the first prime number ($q_{L-1}$) is '$-\alpha$', the increase/decrease between the first prime number ($q_{L-1}$) and the second prime number ($q_{L-2}$) is '$+2\alpha$'.

12. The method of claim 9, wherein the starting scale factor ($q_L$), the first prime number ($q_{L-1}$), and the second prime number ($q_{L-2}$) meet a condition that a value accumulated by multiplying a difference between a log value of the starting scale factor '$q_L$' and a log value of the selected prime numbers ($q_i$, $1 \le i \le L$) by '$2^{i-1}$' is distributed within a range with a bit width difference '$\log_2 (q_0/q_L)$' between a base prime '$q_0$' and the starting scale factor '$q_L$' as an upper limit and a negative value of a bit-width of the encryption error '$B_{clean}$' as a lower limit.

13. The method of claim 12, wherein selected prime sets {$q_0$, $q_1$, . . . , $q_L$} including the starting scale factor ($q_L$), the first prime number ($q_{L-1}$), and the second prime number ($q_{L-2}$) satisfy a condition of a first inequality below:

$$-\log_2 B_{clean} < \sum_{i=1}^{j-1} 2^{i-1} \log_2\left(\frac{q_L}{q_i}\right) < \log_2\left(\frac{q_0}{q_i}\right), \, 2 \le j \le L.$$

14. The method of claim 13, wherein the first prime number ($q_{L-1}$) and the second prime number ($q_{L-2}$) selected successively using the starting scale factor ($q_L$) are selected within a range that satisfies a condition of a second inequality below:

$$\log_2 q_{L-1} = \log_2(q_L) \pm \alpha, \, \log_2 q_{L-2} = \log_2(q_{L-1}) \mp 2\alpha.$$

15. The method of claim 13, wherein a hamming weight of the selected prime numbers {$q_0$, $q_1$, . . . , $q_L$} is 3, 4, or 5.

16. The method of claim 15, wherein a modular multiplication operation on the selected prime numbers {$q_0$, $q_1$, . . . , $q_L$} is performed by a combination of a shift operation and an addition/subtraction operation.

17. A storage device configured to perform cryptographic operations, the device comprising:

at least one nonvolatile memory device; and a storage controller configured to control data input/output of the at least one nonvolatile memory device, and including a homomorphic encryption operator configured to encrypt the data based on a homomorphic encryption method, wherein the homomorphic encryption operator comprises:

a level configuration unit configured to set an encryption level by selecting a plurality of prime numbers of different values based on a scale factor condition used in a lightweight modular multiplication operation and an increase/decrease condition for increasing or decreasing consecutively selected prime numbers, wherein the selected prime numbers meet a condition that a value accumulated by multiplying a difference between a log value of a starting scale factor '$q_L$' and a log value of the selected prime numbers ($q_i$, $1 \le i \le L$) by '$2^{i-1}$' is distributed within a range with a bit width difference '$\log_2(q_0/q_L)$' between a base prime '$g_0$' and the starting scale factor '$q_L$' as an upper limit and a negative value of a bit-width of an encryption error '$B_{clean}$' as a lower limit; and

a modular multiplication operator configured to perform the lightweight modular multiplication operation using the selected prime numbers.

18. The storage device of claim 17, wherein the level configuration unit comprises:

a level constructor for selecting sets of the prime numbers whose numbers have selected Hamming weights, respectively based on the scale factor condition and the increase/decrease condition;

wherein the level configuration unit is further configured to configure the selected sets of the prime numbers with the encryption level using a prime number table.

* * * * *

16